(12) United States Patent
Martini et al.

(10) Patent No.: US 9,056,573 B1
(45) Date of Patent: *Jun. 16, 2015

(54) LAWN AND GARDEN CART WITH PIVOTABLE TOW BAR AND CONTAINER

(71) Applicant: OHIO STEEL INDUSTRIES, INC., Columbus, OH (US)

(72) Inventors: Thomas P. Martini, Gahanna, OH (US); Patrick Montag, Columbus, OH (US); Michael Podrosky, Columbus, OH (US)

(73) Assignee: OHIO STEEL INDUSTRIES, INC., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/953,455

(22) Filed: Jul. 29, 2013

Related U.S. Application Data

(62) Division of application No. 12/875,032, filed on Sep. 2, 2010, now Pat. No. 8,496,298.

(60) Provisional application No. 61/239,147, filed on Sep. 2, 2009.

(51) Int. Cl.
*B60P 1/12* (2006.01)
*B60P 1/04* (2006.01)

(52) U.S. Cl.
CPC ........................................ *B60P 1/04* (2013.01)

(58) Field of Classification Search
CPC ................ B60P 1/04; B60P 1/08; B60P 1/16; B60P 1/28; B62D 63/062; B62D 63/08
USPC .............. 298/5, 9, 10, 17 R, 17 T, 38, 17 SG; 280/479.3, 493, 494; 414/482, 483, 414/485

See application file for complete search history.

(56) References Cited

U.S. PATENT DOCUMENTS

| | | | |
|---|---|---|---|
| 328,981 | A | 10/1885 | Sturgis |
| 3,501,169 | A | 3/1970 | Nutt, Jr. |
| 3,936,070 | A | 2/1976 | Owings |
| D249,138 | S | 8/1978 | Butler |
| 4,126,324 | A | 11/1978 | Browning |
| 4,417,765 | A | 11/1983 | Wirsbinski |
| D286,992 | S | 12/1986 | Doering |
| 4,789,171 | A | 12/1988 | Porter |
| 5,318,315 | A | 6/1994 | White et al. |

(Continued)

OTHER PUBLICATIONS

Brochure, "Gorilla Carts" available from Tricam Industries of Eden Prairie, MN; one page.

(Continued)

*Primary Examiner* — Stephen Gordon
(74) *Attorney, Agent, or Firm* — James R. Eley; Eley Law Firm Co., LPA

(57) ABSTRACT

A towable cart. At least one axle is coupled to a frame. A bottom of a container is also attached to the frame. Each of a pair of wheels are rotatably attached to the axle. A tow bar has first and second ends, the first end of the tow bar being pivotably coupled to one of the frame and the axle. An arm has first and second opposing ends, the first end of the arm being attached to the container and the second end of the arm being selectably secured to the tow bar. The container is fixed in a loading condition when the arm is secured to the tow bar, the container and the frame further being pivotable to an unloading condition when the arm is not secured to the tow bar.

13 Claims, 10 Drawing Sheets

(56) References Cited

U.S. PATENT DOCUMENTS

| | | |
|---|---|---|
| 5,395,163 A | 3/1995 | Mandell et al. |
| 5,544,944 A | 8/1996 | Keech |
| 5,915,706 A | 6/1999 | Mosley |
| 6,213,482 B1 | 4/2001 | Yemini |
| 6,290,301 B1 | 9/2001 | Bockman |
| 6,755,478 B2 | 6/2004 | Messinger-Rapport |
| 7,134,681 B1 | 11/2006 | Jones |
| 7,392,992 B2 | 7/2008 | Stone et al. |
| 7,665,768 B2 | 2/2010 | Duval |
| 8,496,298 B2 * | 7/2013 | Martini et al. .............. 298/5 |
| 2002/0054803 A1 | 5/2002 | Schmidt et al. |
| 2007/0164526 A1 | 7/2007 | Martini et al. |

OTHER PUBLICATIONS

Manual, Gorilla Carts, Heavy Duty Garden Dump Cart Model #GOR866D, available from Tricam Industries of Eden Prairie, MN.
Owner's Manual, Duty Cart Mfg. No. 085, available from Simplicity Manufacturing Company, Inc. of Milwaukee, WI.
Brochure, "Polar Trailer" available from CLAM Corporation, Inc. of Medina, MN; one page.
Cover Page, Owner's Manual, Model No. 45-0464 "Poly Dump Cart" available from Agri-Fab of Sullivan, IL, Feb. 2009.

\* cited by examiner

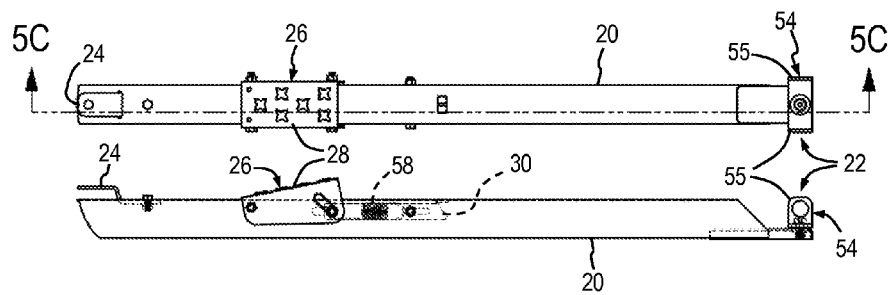
*Fig. 5A*
*Fig. 5B*
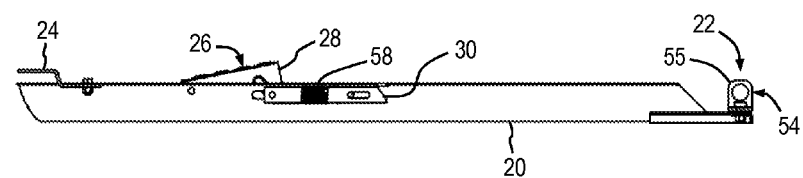
*Fig. 5C*
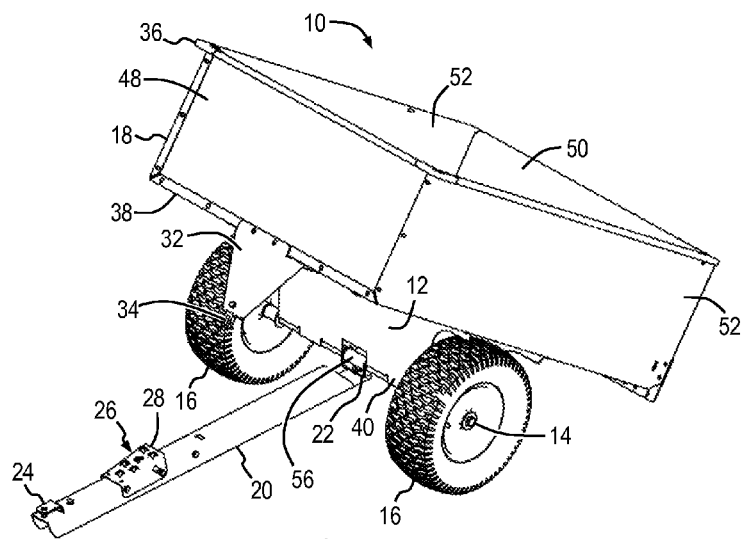
*Fig. 6*

LAWN AND GARDEN CART WITH PIVOTABLE TOW BAR AND CONTAINER

This application is a division of U.S. patent application Ser. No. 12/875,032, filed Sep. 2, 2010, now issuing as U.S. Pat. No. 8,496,298, which claims priority to U.S. provisional application 61/239,147, filed Sep. 2, 2009, the entire contents of each being hereby incorporated by reference.

FIELD

This invention relates to lawn and garden carts, in particular a cart having a container that is pivotable with respect to a tow bar of the cart, the tow bar in turn being laterally pivotable with respect to an axle of the cart.

BACKGROUND

Various equipment and accessories for use with a lawn tractor are known in the art. In particular, lawn and garden carts are often used as a tool to transport materials such as lawn debris, tools and equipment. Typically, a lawn cart includes an open container that is mounted to a frame and has a base with three or four sides. The frame is in turn supported by two wheels. A tow bar with a hitch extends outwardly from the frame. The hitch is attached to a coupling at the rear of the tractor. Once attached, the cart can be towed about the yard by the lawn tractor to transport the materials loaded into the bed.

A drawback of most current carts is that they must be disconnected from the tractor for dumping, a cumbersome and time-consuming task. In addition, the tow bar is typically rigidly coupled to the axle of the cart, making the cart difficult to maneuver. There is a need for a lawn and garden cart with improved maneuverability and a convenient way to dump the contents of the container.

SUMMARY

A lawn and garden cart with a pivotable container and a laterally pivotable hitch and is disclosed according to an embodiment of the present invention. The lawn cart includes a container that is pivotable about a wheel axle. A tow bar extends from the axle toward the front of the cart, and the container is selectably secured to the tow bar. In a transporting condition the container is secured to the tow bar to stably receive and transport materials placed in the container. In an unloading condition the container is released from the tow bar and moves away from the tow bar, pivoting about the axle to a dumping position. The tow bar is configured to pivot laterally with respect to the axle, increasing the maneuverability of the cart.

One embodiment of the present invention is a towable cart. At least one axle is coupled to a frame. A bottom of a container is attached to a second, opposing end of the frame. Each of a pair of wheels are rotatably attached to the axle. A tow bar has first and second ends, the first end of the tow bar being pivotably coupled to one of the frame and the axle. An arm has first and second opposing ends, the first end of the arm being attached to the container and the second end of the arm being selectably secured to the tow bar. The container is fixed in a loading condition with the bottom generally parallel to the tow bar when the arm is secured to the tow bar, the container and the frame further being pivotable to an unloading condition when the arm is not secured to the tow bar.

In another embodiment of the present invention a towable cart comprises a frame. At least one axle is coupled to a first end of the frame. A container having a bottom, a front wall, an opposing rear wall, and a pair of spaced-apart sidewalls is provided, the bottom of the container being attached to the frame. Each of a pair of wheels are rotatably attached to the axle. A tow bar having first and second ends is also provided. A bracket is located intermediate the first end of the tow bar and one of the axle and the frame, the bracket being rotatably attached to the first end of the tow bar and pivotably coupled to one of the axle and the frame. An arm has first and second opposing ends, the first end of the arm being attached to the container, the second end of the arm having a notched portion. A latch selectably secures the second end of the arm to the tow bar. The container is fixed in a loading condition with the bottom generally parallel to the tow bar when the arm is secured to the tow bar. When the arm is not secured to the tow bar the container and the frame are pivotable about the axle to an unloading condition. In addition, the tow bar is movable about the axle on a first and a second axis.

BRIEF DESCRIPTION OF THE DRAWINGS

Further features of the inventive embodiments will become apparent to those skilled in the art to which the embodiments relate from reading the specification and claims with reference to the accompanying drawings, in which:

FIGS. 5A, 5B and 5C show top, side and sectional views respectively of the tow bar of FIG. 4;

FIG. 6 is a perspective view of the cart of FIG. 3;

DETAILED DESCRIPTION

Figure 1:
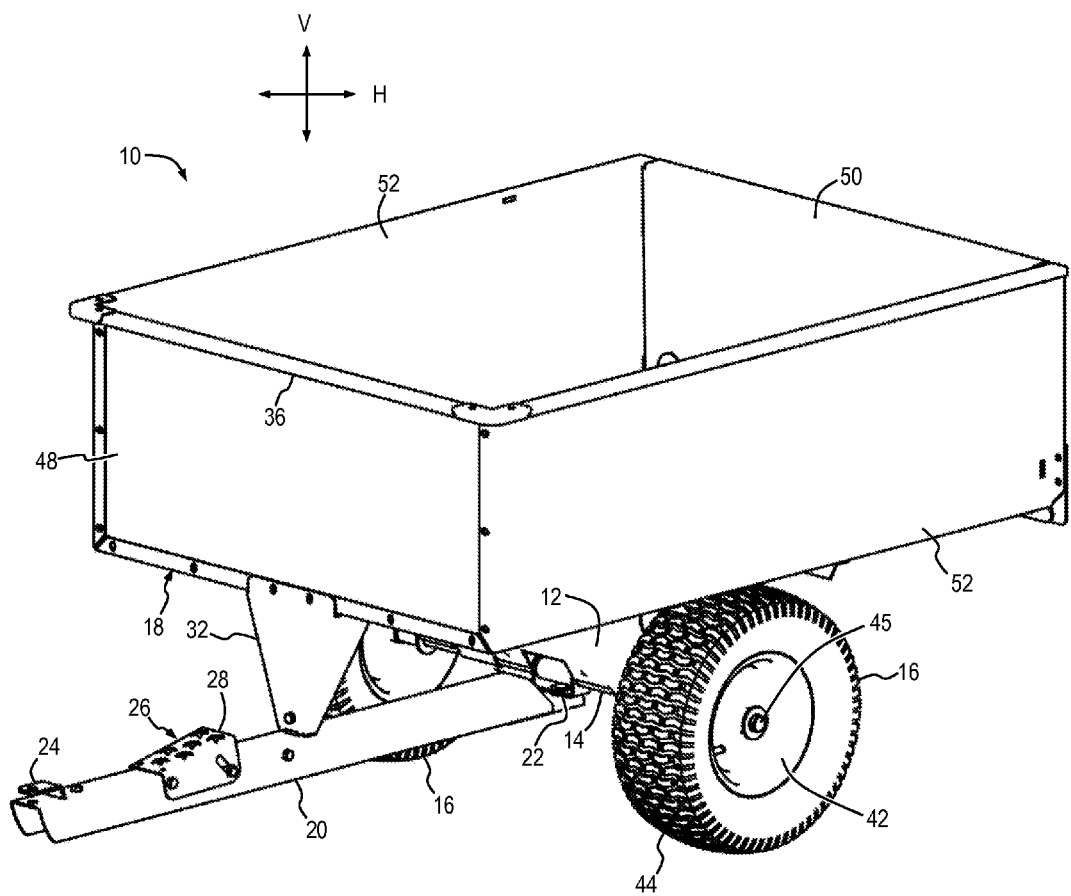
FIG. 1 is a perspective view showing the general arrangement of a lawn and garden cart according to an embodiment of the present invention.

In the discussion that follows, like reference numerals are used to refer to like structures in the various figures.

Figure 2A:
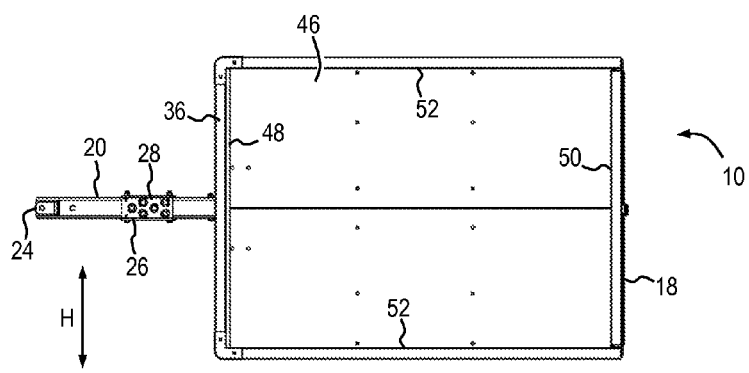
FIGS. 2A, 2B, 2C and 2D are top, side, front and bottom views respectively of the cart of FIG. 1.
Figure 2B:
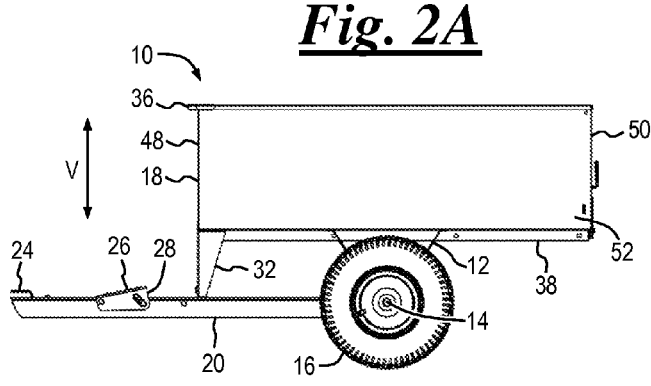
Figure 2C:
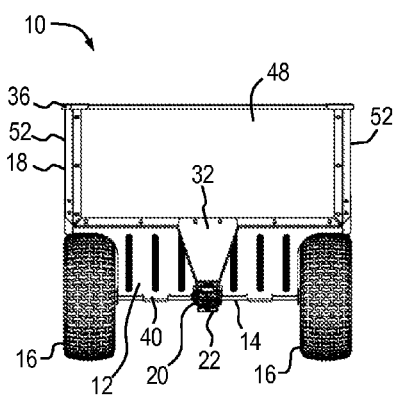
Figure 2D:
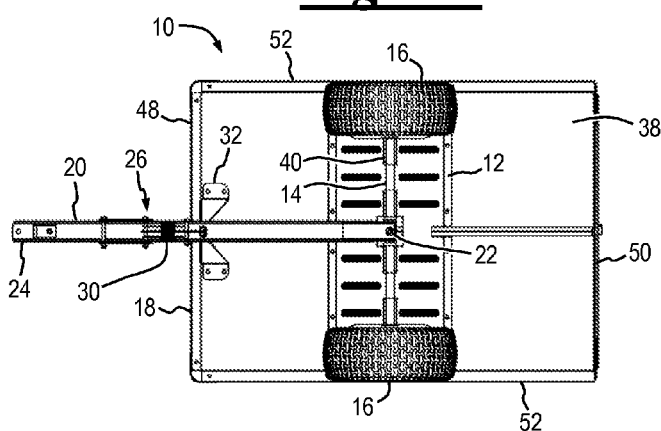
Figure 3:
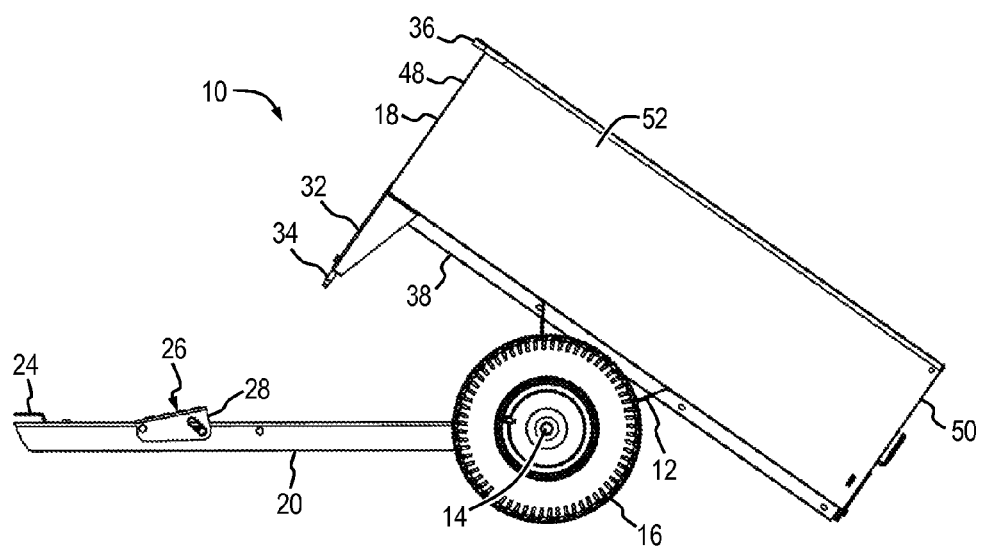
FIG. 3 is a side view of the cart of FIG. 1 with a container of the cart in an unloading condition.

The general arrangement of a lawn and garden cart (hereafter "cart") 10 is depicted in FIGS. 1 through 3 according to an embodiment of the present invention. Cart 10 includes a frame 12 having an axle 14 to which a pair of wheels 16 is rotatably attached. A container 18 is also attached to frame 12. A tow bar 20 is pivotably coupled to axle 14 by a connector 22 at a first end, the connector allowing the tow bar to both pivot and move laterally with respect to the axle. A hitch 24 at an opposing second end of tow bar 20 facilitates coupling of cart 10 to a typical lawn tractor (not shown) or other towing device. Cart 10 also includes a latch 26 having a biased pivotable lever 28 that is coupled to a slidable member 30. An arm 32 extends from container 18 and through tow bar 20, a notched end 34 of the arm being selectably engaged by slidable member 30 to secure the arm to the tow bar.

Frame 12 receives axle 14 at a first end, while an opposing second end of the frame is attached to an underside 38 of container 18, as shown in FIGS. 2B, 2C and 2D. Frame 12 may be generally V-shaped as shown, or may be made in any other suitable shape within the scope of the invention. Frame 12 may be made from any material or combination of materials suitable for the expected structural load and environment for cart 10 including, without limitation, metal, composites and engineered plastics. In addition, frame 12 may be formed in any conventional manner, such as by molding, casting, machining, cold forming and forging. Frame 12 may be finished in any conventional manner, such as painting, powder coating, plating, or may be unfinished.

Axle 14 is attached to frame 12 with one or more axle connectors 40 and is oriented generally parallel to the underside 38 of container 18, as shown in FIGS. 2B, 2C and 2D. In some embodiments of the present invention axle 14 may be configured to rotate within axle connectors 40 of frame 12. Alternatively, axle 14 may be rigidly coupled to axle connectors 40.

Wheels 16 are attached to opposing ends of axle 14, as shown in FIGS. 2C and 2D. Wheels 16 may include bearings or rotating bushings (not shown) interposed between the wheel and axle 14. Alternatively, wheels 16 may be rigidly attached to axle 14, the axle being rotatable within axle connectors 40 in the manner previously discussed. Wheels 16 may be formed from a unitary piece of any material suitable for the expected structural load and environment for lawn and garden cart 10. Alternatively, wheels 16 may include a rim 42 and a pneumatic or solid tire 44, as shown in FIG. 1. Wheels 16 are preferably removable and may be secured to axle 14 with fasteners 45 (FIG. 1) including, without limitation, bolts, screws, nuts, press-fit caps, lugs and pins.

Container 18 is sized and shaped to receive materials including, without limitation, firewood, lawn debris, fertilizer, soil, tools and equipment. Container 18 may include a bottom 46, a front wall 48, an opposing rear wall 50 and a pair of opposing sidewalls 52. Front wall 48, rear wall 50 and sidewalls 52 may be oriented generally at right angles to bottom 46, as shown in FIGS. 1 through 3. Alternatively, one or more of front wall 48, rear wall 50 and sidewalls 52 may be oriented at an acute or obtuse angle with respect to bottom 46. Container 18 may be made of any material or combination of materials suitable for the expected structural load and environment for cart 10 including, without limitation, metal, composites and engineered plastics. In addition, container 18 may be formed in any conventional manner, such as by molding, casting, machining, cold forming and forging, and may be made as a unitary component or from components and assembled. Furthermore, container 18 may be finished in any conventional manner, such as painting, powder coating, plating, or may be unfinished.

Figure 7:
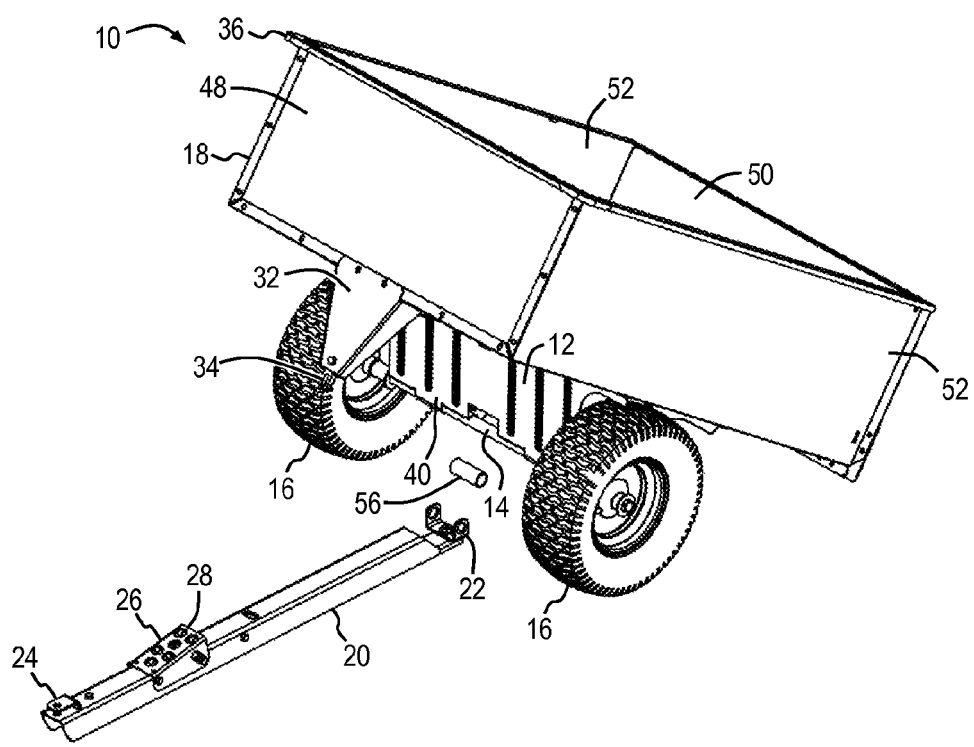
FIG. 7 shows the tow bar of the cart separated from the axle of the cart of FIG. 1.

With reference to FIGS. 4 and 5A, 5B and 5C, tow bar 20 is generally elongate and is attached to frame 12 at a first tow bar end. Tow bar 20 extends outwardly from frame 12 and is detachably engageable with axle 14, the axle being slid through a bracket 54 and disposed between a pair of tabs 55 of the bracket, as depicted in FIGS. 6 and 7. A support spacer 56 may optionally be assembled with bracket 54 on axle 14, as shown in FIGS. 6 and 7. Tow bar 20 may be generally rectangular, having a "U" shape, or may be a closed rectangular box. In other embodiments tow bar 20 may have a generally circular shape. Tow bar 20 may be made of metal, such as steel, or from other materials such as high density plastic and composites.

Figure 4:
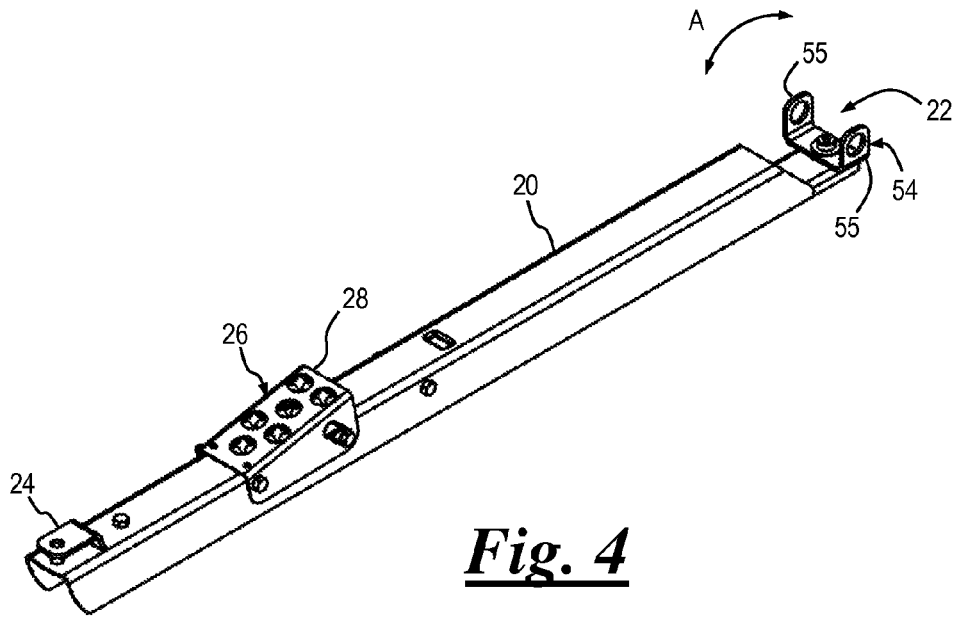
FIG. 4 shows additional features of the tow bar of the cart.
Figure 8:
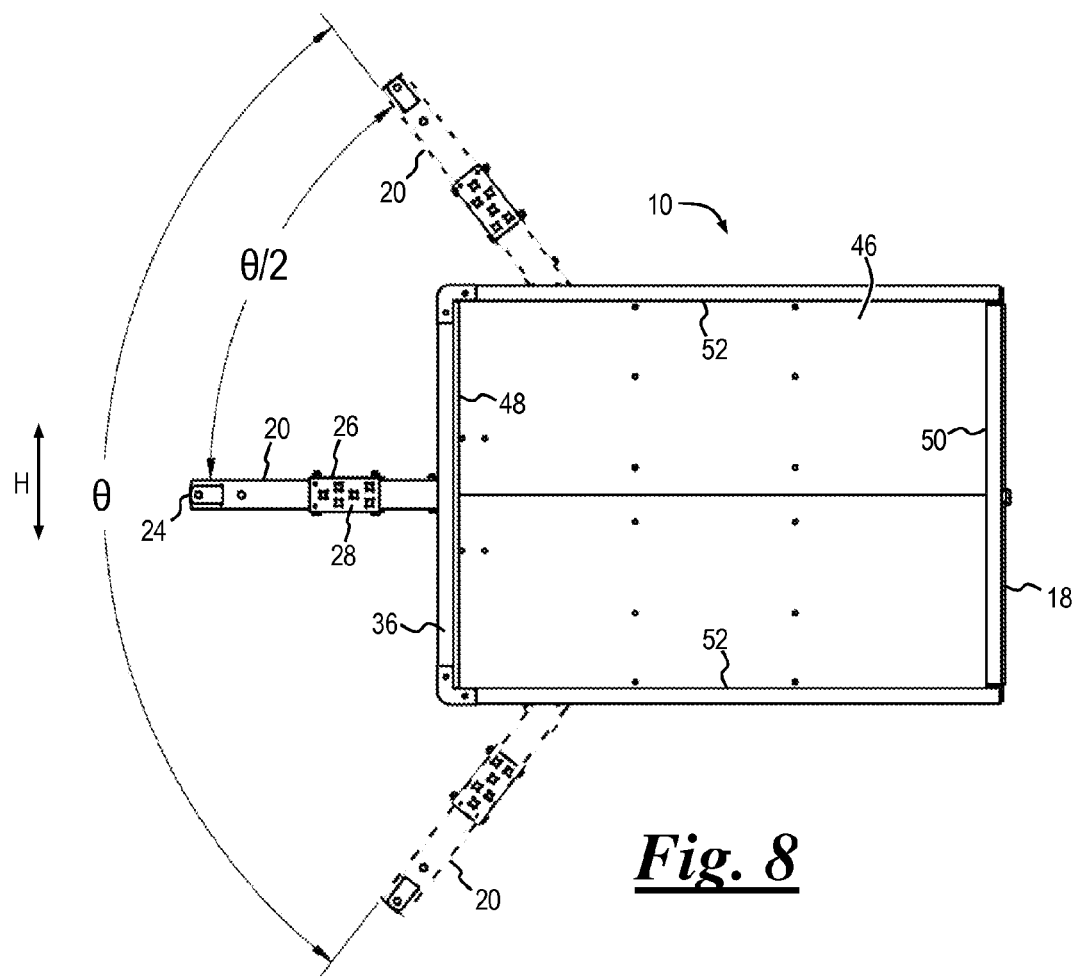
FIG. 8 shows the cart of FIG. 1 with a tow bar that may be moved laterally throughout a range of positions with respect to a towing position.
Figure 9:
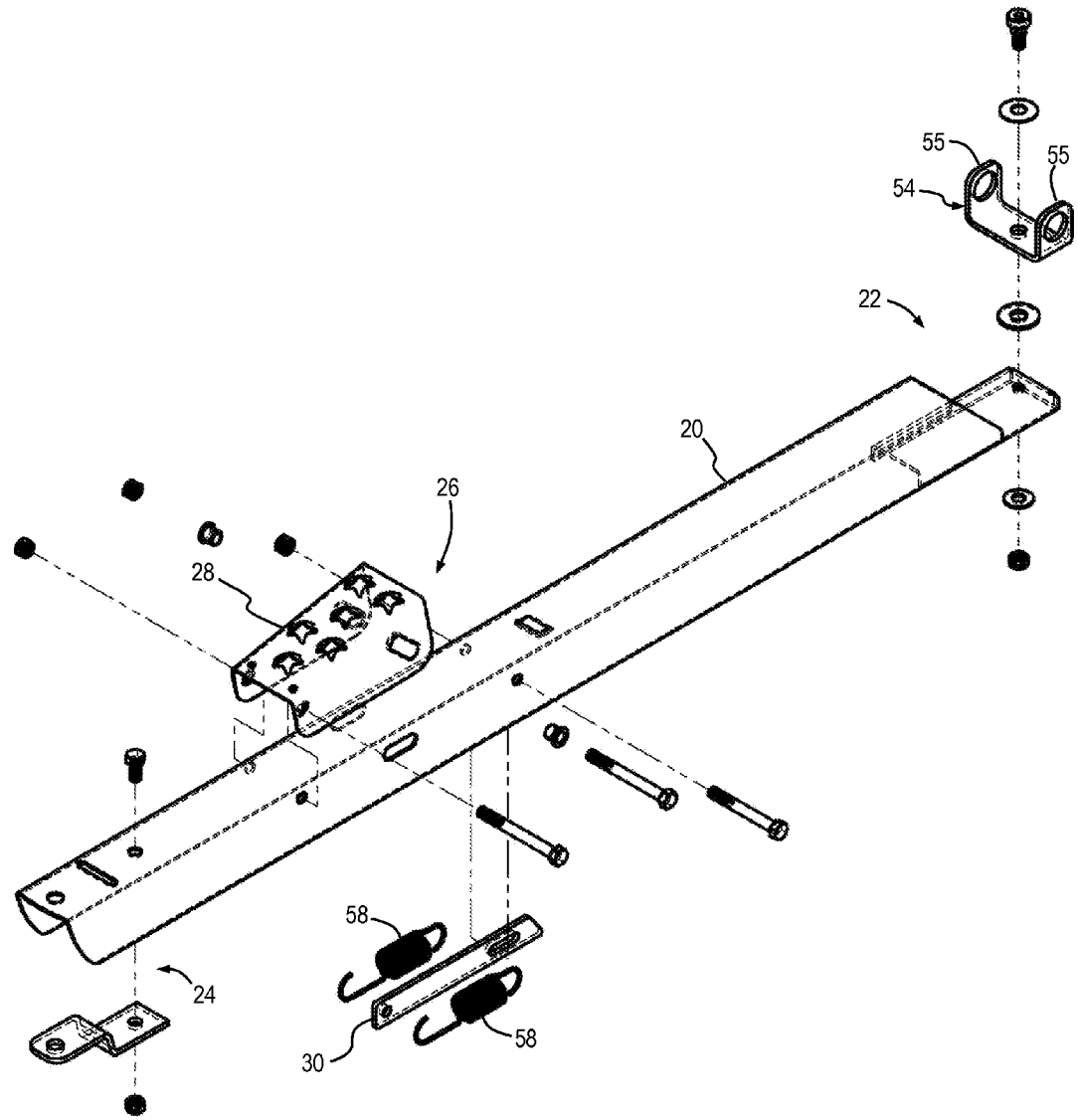
FIG. 9 is an exploded view showing the components of the tow bar of FIG. 4 in greater detail.
Figure 10:
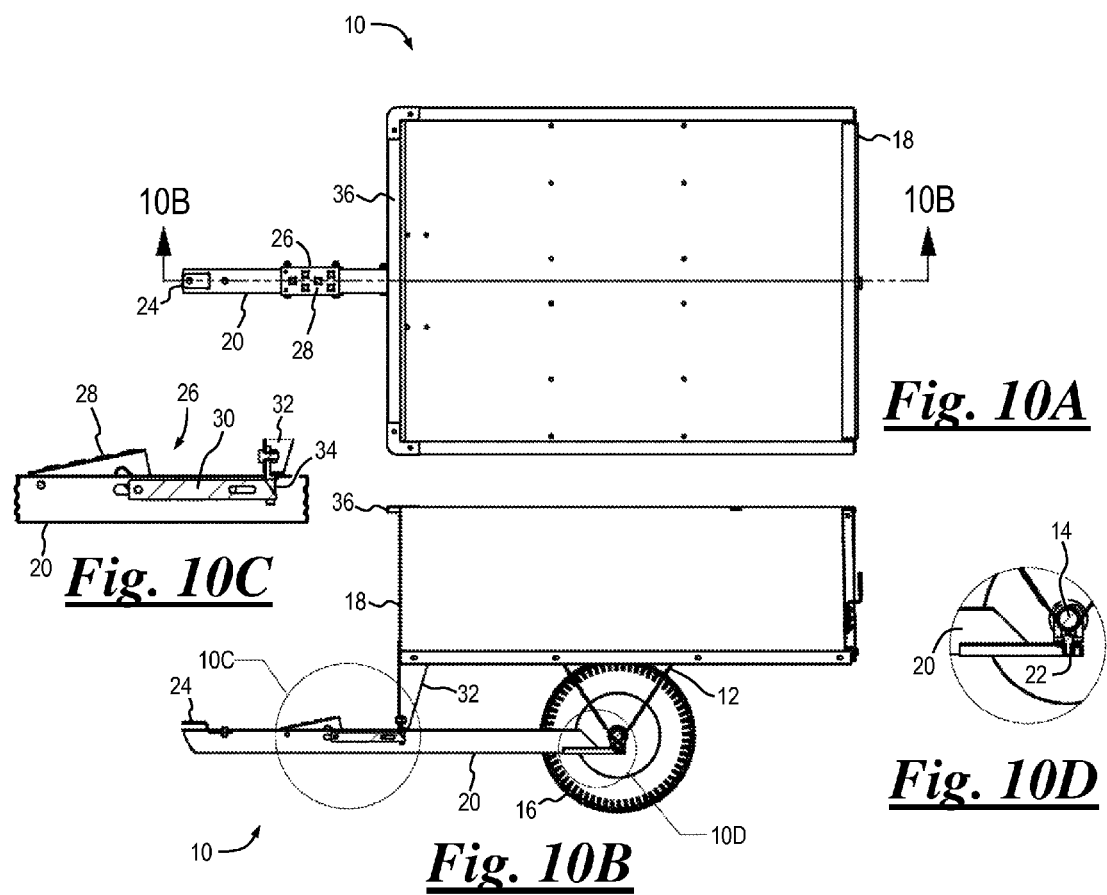
FIGS. 10A and 10B are top and side views respectively of the cart.
FIG. 10C is a close-up view showing further details of the latch of the cart.
FIG. 10D is a close-up view showing further details of the tow bar connector of the cart.

Bracket 54 of tow bar 20 may be made rotatable with respect to the tow bar, as indicated by arrow "A" of FIG. 4. This allows tow bar 20 to be moved laterally within a predetermined range of movement θ as shown in FIG. 8. In one embodiment the lateral movement of tow bar 20 is limited by wheels 16, the tow bar coming into contact with the wheels at opposing lateral extremes.

As shown in FIG. 1, hitch 24 is located at a second end of tow bar 20 distal to frame 14, and is configured to couple cart 10 to a lawn tractor or other towing device (not shown). Hitch 24 may be of any suitable type including a ball hitch, drawbar hitch, sleeve hitch, and three-point hitch.

With reference to FIGS. 1, 9, and 10A through 10D, latch 26 includes slidable member 30, which is biased by one or more biasing elements 58 that urge the slidable member to engage notched end 34 of arm 32 extending away from container 18, thereby selectably securing the container to the tow bar as shown in FIG. 1. Lever 28 is pivotably coupled to tow bar 20 and is also coupled to slidable member 30 such that, when the lever is operated against the bias of biasing elements 58, the slidable member is urged away from notched end 34, thereby releasing arm 32 (and thus container 18) from tow bar 20. In this condition container 18 is free to pivot or rotate about axle 14, as shown in FIGS. 3 and 6.

In use, slidable member 30 is biased to engage notched end 34 of arm 32, thereby securing container 18 to tow bar 20 with the bottom 46 of the container oriented roughly parallel to the tow bar and the tow bar extending away from the front of cart 10 (FIG. 1). Hitch 24 is coupled to a lawn tractor or other towing device. Cart 10 may moved about as needed, container 18 being filled by the user with material as desired.

When it is desired to unload the contents of container 18 a user actuates lever 28, urging slidable member 30 away from notched end 34 of arm 32, thereby releasing the arm from the tow bar. The user may then grasp a front lip 36 of container 18 and pivot the container about axle 14, away from tow bar 20 (FIGS. 3, 6). With latch 26 released and container 18 pivoted away from tow bar 20, the tow bar is further laterally movable with respect to axle 14, allowing the user to maneuver cart 10. For example, the user may simply pivot container 18 away from tow bar 20 on a vertical axis "V" (FIG. 2B) if it is desired to dump the contents of the container straight back. The user may also pivot the tow bar 20 to any lateral angle about a horizontal axis "H" (FIG. 2A) within the range θ with respect to axle 14 (FIG. 8) by means of connector 22 to manipulate the container to a preferred position and then unload the contents to the right or left. Thus, the container 18 attached to the frame 12 combine to form a container assembly which is movable in at least two axes ("V" and "H") with respect to the tow bar 20 when the container assembly is not secured to the tow bar.

Figure 11:
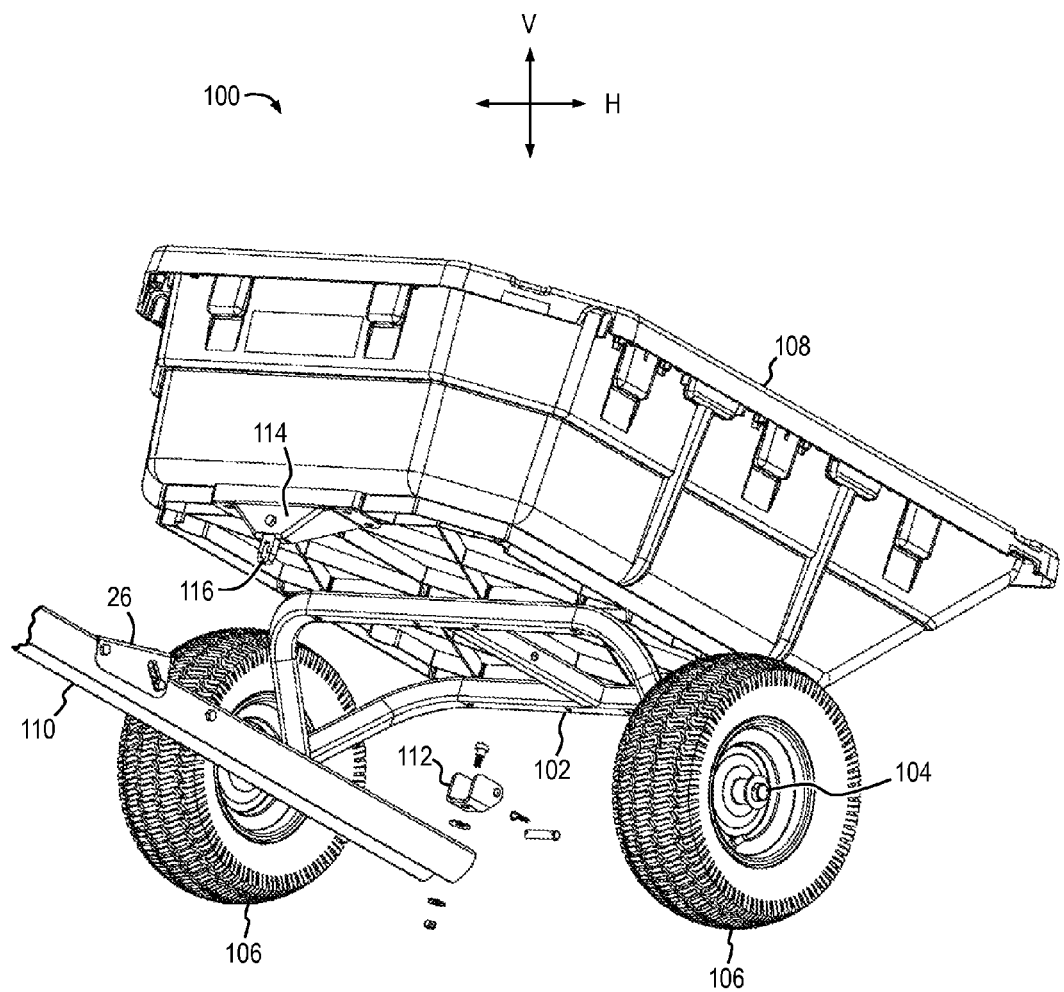
FIG. 11 is a perspective view showing the general arrangement of a lawn and garden cart according to another embodiment of the present invention, showing the assembly of a tow bar connector.
Figure 12:
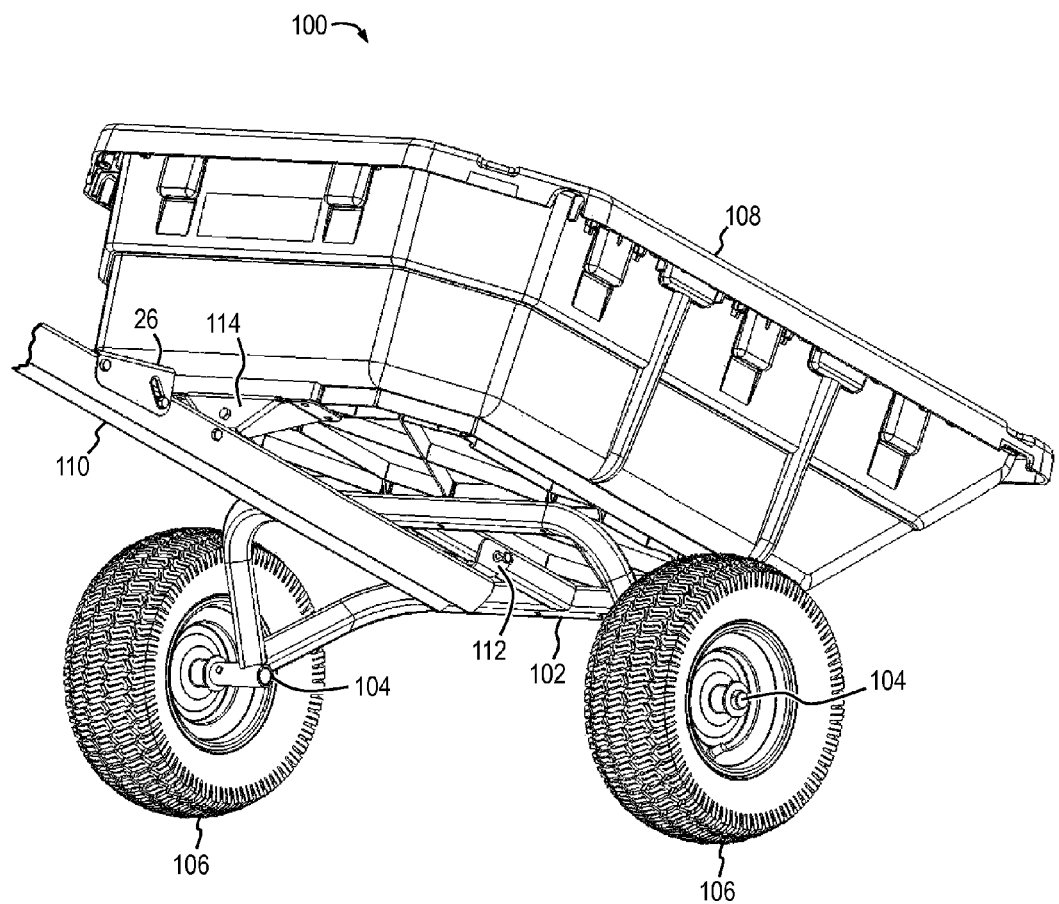
FIG. 12 is a perspective view of the lawn and garden cart of FIG. 11 with the tow bar assembled to the cart.

The general arrangement of a cart 100 is depicted in FIGS. 11 and 12 according to another embodiment of the present invention. Cart 100 includes a frame 102 having a pair of axles 104, each axle having a wheel 106 rotatably attached. A container 108 is also attached to frame 102. A tow bar 110 is pivotably coupled to frame 102 by a connector 112 at a first end, the connector allowing the tow bar both to pivot and move laterally with respect to the frame. A hitch 24 (FIGS. 1, 9) at an opposing second end of tow bar 110 facilitates coupling of cart 100 to a typical lawn tractor (not shown) or other towing device. Cart 100 also includes a latch 26 having a biased pivotable lever 28 that is coupled to a slidable member 30. Details of latch 26 and its associated components are provided above and are illustrated in FIGS. 9 and 10A-10D. An arm 114 extends from container 108 and through tow bar 110, a notched end 116 of the arm being selectably engaged by slidable member 30 to secure the arm to the tow bar. Thus, the container 108 attached to the frame 102 combine to form a container assembly which is movable in at least two axes ("V" and "H") with respect to the tow bar 110 when the container assembly is not secured to the tow bar. Cart 100 is otherwise similar to cart 10 and thus will not be detailed further here.

While this invention has been shown and described with respect to a detailed embodiment thereof, it will be understood by those skilled in the art that changes in form and detail thereof may be made without departing from the scope of the claims of the invention.

What is claimed is:

1. A towable cart, comprising:
   a frame;
   a container attached to the frame;
   a tow bar having first and second ends;
   a bracket intermediate the first end of the tow bar and the frame, the bracket being rotatably attached to the first end of the tow bar and pivotably coupled to the frame;
   an arm having first and second opposing ends, the first end of the arm being attached to the container; and
   a latch to selectably secure the second end of the arm to the tow bar,
   the container being fixed in a loading condition when the arm is secured to the tow bar, the container further being pivotable to an unloading condition when the arm is not secured to the tow bar, and
   the tow bar being movable on a first and a second axis with respect to the frame.

2. The towable cart of claim 1, wherein the frame includes a frame portion and an axle portion.

3. The towable cart of claim 2, further including a pair of wheels, a first wheel of the pair of wheels being rotatably attached to a first end of the axle portion and a second wheel of the pair of wheels being rotatably attached to a second, opposing end of the axle portion.

4. The towable cart of claim 2, wherein the bracket further includes a pair of spaced-apart tabs, the tabs being pivotably coupled to the axle portion of the frame.

5. The towable cart of claim 4, further including a support spacer, the support spacer being intermediate the tabs of the bracket.

6. The towable cart of claim 1, wherein the container includes a bottom, a front wall, an opposing rear wall, and a pair of spaced-apart sidewalls, the bottom of the container being attached to the frame.

7. The towable cart of claim 6 wherein the container is fixed in a loading condition with the bottom of the container generally parallel to the tow bar when the arm is secured to the tow bar.

8. The towable cart of claim 1, wherein the second end of the arm includes a notched portion.

9. The towable cart of claim 8, wherein the notched portion of the arm extends into the tow bar when secured thereto.

10. The towable cart of claim 8, wherein the latch further comprises:
    a slidable member to selectably engage the notched portion;
    a biasing element to urge the slidable member into engagement with the notched portion; and
    a lever pivotably coupled to the tow bar and slidably coupled to the slidable member,
    wherein the lever, when actuated, urges the slidable member away from the notched portion, releasing the arm from the tow bar.

11. The towable cart of claim 1, further comprising a hitch attached to the second end of the tow bar.

12. A towable cart, comprising:
    a frame, the frame including a frame portion, a first axle portion and a second axle portion;
    a container attached to the frame;
    a first wheel and a second wheel, the first wheel being rotatably attached to the first axle portion and the second wheel being rotatably attached to the second axle portion;
    a tow bar having first and second ends;
    a bracket intermediate the first end of the tow bar and the frame, the bracket being rotatably attached to the first end of the tow bar and pivotably coupled to the frame;
    an arm having first and second opposing ends, the first end of the arm being attached to the container, the second end of the arm having a notched portion; and
    a latch to selectably secure the second end of the arm to the tow bar, the notched portion of the arm extending into the tow bar when secured thereto,
    the container being fixed in a loading condition when the arm is secured to the tow bar, the container further being pivotable to an unloading condition when the arm is not secured to the tow bar, and
    the tow bar being movable on a first and a second axis with respect to the frame.

13. A towable cart, comprising:
    a frame, the frame including a frame portion and at least one axle portion;
    a container attached to the frame;
    a pair of wheels, each wheel being rotatably attached to the at least one axle portion;
    a tow bar having first and second ends, the first end of the tow bar being coupled to the frame;
    an arm having first and second opposing ends, the first end of the arm being attached to the container and the second end of the arm extending into and being selectably secured to the tow bar, a notched portion extending from the second end of the arm; and
    a latch to releasably secure the arm to the tow bar, the latch including:
    a slidable member to selectably engage the notched portion;
    a biasing element to urge the slidable member into engagement with the notched portion; and
    a lever pivotably coupled to the tow bar and slidably coupled to the slidable member,
    wherein the lever, when actuated, urges the slidable member away from the notched portion, releasing the arm from the tow bar,
    the container being fixed in a loading condition when the arm is secured to the tow bar, the container further being pivotable to an unloading condition when the arm is not secured to the tow bar.

* * * * *